(12) United States Patent
Kojima et al.

(10) Patent No.: US 7,178,326 B2
(45) Date of Patent: Feb. 20, 2007

(54) EXHAUST GAS PURIFYING APPARATUS (75) Inventors: Kazuo Kojima, Nagoya (JP); Hiroshi Haraguchi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/285,093

(22) Filed: Nov. 23, 2005

(65) Prior Publication Data

US 2006/0112679 A1  Jun. 1, 2006

(30) Foreign Application Priority Data

Nov. 29, 2004   (JP)   ............................. 2004-343342

(51) Int. Cl.
*F01N 3/00* (2006.01)
(52) U.S. Cl. ........................... 60/278; 60/280; 60/295; 60/311; 60/605.2; 123/568.12; 123/568.19; 123/568.21
(58) Field of Classification Search ................. 60/278, 60/280, 287, 295, 297, 311, 605.2; 123/568.11, 123/568.12, 568.19, 568.2, 568.21
See application file for complete search history.

(56) References Cited

U.S. PATENT DOCUMENTS

| | | | |
|---|---|---|---|
| 6,170,469 B1 * | 1/2001 | Itoyama et al. ............. 123/480 |
| 6,763,799 B2 * | 7/2004 | Ito et al. ...................... 123/299 |
| 6,957,642 B2 * | 10/2005 | Miura ........................ 123/399 |
| 6,978,602 B2 * | 12/2005 | Ohtake et al. ................. 60/295 |
| 6,993,909 B2 * | 2/2006 | Matsunaga et al. ......... 60/605.2 |
| 7,107,978 B2 * | 9/2006 | Itoyama ...................... 123/683 |

FOREIGN PATENT DOCUMENTS

| | | |
|---|---|---|
| EP | 0 987 427 | 1/2004 |
| JP | 2003-51791 | 2/2003 |
| JP | 2003-206724 | 7/2003 |
| JP | 2004-257336 | 9/2004 |

* cited by examiner

*Primary Examiner*—Binh Q. Tran
(74) *Attorney, Agent, or Firm*—Nixon & Vanderhye P.C.

(57) ABSTRACT

An ECU controls an opening degree of an EGR gas switch valve based on a temperature of intake air and a load state of an engine in such a manner that a temperature of exhaust gas becomes a suitable temperature, which is suitable for regeneration of a particulate filter arranged in an exhaust gas passage. In this way, cooled EGR gas, which passes a main passage, and hot EGR gas, which passes a bypass passage, are appropriately mixed. In a case, where reliability of an EGR valve cannot be maintained, EGR cut is performed.

14 Claims, 7 Drawing Sheets

ENGINE START (COOLANT ~15°C)

| FRESH AIR TEMPERATURE | | ENGINE LOAD | | |
|---|---|---|---|---|
| | | LOW | MIDDLE | HIGH |
| | LOW | EGR CUT | EGR CUT | EGR CUT |
| | HIGH | EGR CUT | EGR CUT | EGR CUT |

FIG. 5B

COLD TEMPERATURE (COOLANT 15~40°C)

| FRESH AIR TEMPERATURE | | ENGINE LOAD | | |
|---|---|---|---|---|
| | | LOW | MIDDLE | HIGH |
| | LOW | HOT EGR | HOT EGR | EGR CUT |
| | HIGH | HOT EGR | HOT EGR | EGR CUT |

FIG. 5C

WARMING-UP (COOLANT 40~80°C)

| FRESH AIR TEMPERATURE | | ENGINE LOAD | | |
|---|---|---|---|---|
| | | LOW | MIDDLE | HIGH |
| | LOW | HOT EGR | COOLED EGR | EGR CUT |
| | HIGH | INTERMEDIATE OPENING DEGREE OF SWITCH VALVE | COOLED EGR | EGR CUT |

FIG. 5D

AFTER WARMING-UP (COOLANT 80°C~)

| FRESH AIR TEMPERATURE | | ENGINE LOAD | | |
|---|---|---|---|---|
| | | LOW | MIDDLE | HIGH |
| | LOW | INTERMEDIATE OPENING DEGREE OF SWITCH VALVE | COOLED EGR | EGR CUT |
| | HIGH | COOLED EGR | COOLED EGR | EGR CUT |

EXHAUST GAS PURIFYING APPARATUS

CROSS REFERENCE TO RELATED APPLICATION

This application is based on and incorporates herein by reference Japanese Patent Application No. 2004-343342 filed on Nov. 29, 2004.

BACKGROUND OF THE INVENTION

1. Field of the Invention

The present invention relates to an exhaust gas purifying apparatus of an internal combustion engine, which has a particulate filter and an EGR device.

2. Description of Related Art

To address environmental concerns, it has been demanded to reduce the particulates, i.e., particulate matter (hereinafter, simply referred to as PM) and nitrogen oxides (NOx), which are contained in the exhaust gas of a diesel engine. The PM can be removed from the exhaust gas by providing a particulate filter (hereinafter, referred to as DPF) in an exhaust gas passage to collect the PM. The collected PM of the DPF is periodically combusted to recover a PM collecting performance of the DPF. In the DPF, a large number of passages, each of which is defined by porous partition walls, is formed. When the exhaust gas passes through the porous walls of the DPF, the PM contained in the exhaust gas is captured by the porous walls. The regeneration of the DPF is performed when the accumulated amount of the PM exceeds a predetermined amount.

The regeneration of the DPF is performed when the accumulated amount of the PM exceeds a predetermined amount. In the regeneration of the DPF, the hot (high temperature) exhaust gas is supplied to the DPF to increase the temperature of the PM equal to or higher than the combustion temperature of the PM. For example, substantial retardation of the main fuel injection timing or implementation of a single post fuel injection or multiple post fuel injections after the main fuel injection may be used as a temperature increasing means at the time of regenerating the DPF. By selecting the suitable temperature increasing means, which corresponds to the current operational state, the temperature of the DPF can be effectively increased to a target temperature (e.g., 500 to 650 degrees Celsius).

Furthermore, NOx emissions can be reduced by providing an exhaust gas recirculation (EGR) device. The exhaust gas after the combustion contains a large amount of inactive gas, such as water vapor or carbon dioxide. When a portion of the exhaust gas is recirculated into the intake air passage as the EGR gas, the combustion temperature is reduced to limit generation of NOx. In this instance, an EGR cooler may be provided in an EGR passage, which connects between the exhaust gas passage and the intake air passage, to cool the EGR gas. By cooling the EGR gas through the EGR cooler, a charging efficiency of the EGR gas is increased to slow down the combustion and thereby to increase the above effect. A bypass passage may be arranged in parallel to the EGR passage, in which the EGR cooler is provided. At the time of engine start, through use of the bypass passage, the EGR gas may be returned to the intake air passage without passing through the EGR cooler. This technique is disclosed in, for example, Unexamined Japanese Patent Publication Number JP2003-51791A and European Patent Publication Number EP0987427B1.

Here, it has been proposed to use the EGR as a means for improving the temperature increasing performance at the time of DPF regeneration. When the EGR is performed, the hot (high temperature) exhaust gas is introduced from the EGR passage to the intake air passage. Thus, the temperature of the intake air supplied to the combustion chambers of the cylinders is increased. As a result, the temperature of the exhaust gas supplied to the DPF is advantageously increased while the NOx is advantageously reduced.

However, in the case of the previously proposed temperature control system for controlling the temperature during the DPF regeneration, the temperature of the exhaust gas near an exhaust manifold immediately after the outputs of the combustion chambers would possibly be increased to 700 degrees Celsius or higher when the temperature of the exhaust gas on the upstream side of the DPF or on the downstream side of the DPF is adjusted to the target temperature. In the EGR valve, which controls the EGR flow rate, a flow passage forming member for conducting the exhaust gas is often made of a material that uses aluminum as its base material. Thus, when the hot exhaust gas is introduced into the flow passage forming member of the EGR valve, corrosion would possible take place in the flow passage forming member to deteriorate durability of the EGR valve.

In order to address the above disadvantage, the EGR gas needs to be cut or needs to be substantially reduced during the regeneration of the DPF. As a result, the exhaust gas temperature increasing effect of the EGR or the NOx reducing effect of the EGR cannot be sufficiently achieved. Furthermore, the exhaust gas temperature can be reduced through use of the EGR cooler. However, in such a system that uses the EGR cooler, when the EGR is performed during the DPF regeneration, the EGR gas is cooled equal to or close to the temperature of the coolant of the EGR cooler. Thus, the intake air temperature cannot be increased, and the sufficient exhaust gas temperature increasing effect cannot be achieved.

SUMMARY OF THE INVENTION

The present invention addresses the above disadvantages. Thus, it is an objective of the present invention to provide an exhaust gas purifying apparatus, which achieves both an exhaust gas temperature increasing effect and an NOx reducing effect through use of an EGR during regeneration of a particulate filter by enabling supply of high temperature EGR gas into an air intake passage while maintaining a reliability of constituent members, such as an EGR valve.

To achieve the objective of the present invention, there is provided an exhaust gas purifying apparatus for an internal combustion engine. The exhaust gas purifying apparatus includes a particulate filter, a regeneration control means, an EGR passage and an EGR control means. The particulate filter is arranged in an exhaust gas passage of the internal combustion engine to collect particulates contained in exhaust gas in the exhaust gas passage. The regeneration control means is for regenerating the particulate filter by increasing a temperature of the particulate filter to combust and remove the particulates accumulated on the particulate filter. The EGR passage recirculates a portion of the exhaust gas as EGR gas from the exhaust gas passage into an intake air passage of the internal combustion engine, which conducts intake air. The EGR control means is for controlling a temperature and a flow rate of the EGR gas, which is recirculated into the intake air passage through the EGR passage, based on a demand of the internal combustion engine. The EGR control means includes a regeneration time EGR control means for executing an EGR operation for controlling the temperature and the flow rate of the EGR gas in regeneration time of the particulate filter, during which the particulate filter is regenerated by the regeneration control means. The regeneration time EGR control means controls a degree of the EGR operation such that a temperature of the exhaust gas, which is supplied to the particulate filter, becomes a suitable temperature, which is suitable for regeneration of the particulate filter.

The EGR passage may include a main passage and a bypass passage. The main passage has an EGR cooler, which cools the EGR gas. The bypass passage bypasses the EGR cooler and communicates between the exhaust gas passage and the intake air passage. The regeneration time EGR control means may control the temperature of the EGR gas, which is recirculated into the intake air passage in the regeneration time of the particulate filter, to a target temperature by adjusting one of: a quantity of the EGR gas, which passes the main passage, and a quantity of the EGR gas, which passes the bypass passage; and a ratio between the EGR gas, which passes the main passage, and the EGR gas, which passes the bypass passage.

The EGR control means may further include a non-regeneration time EGR control means for executing an EGR operation for controlling the temperature and the flow rate of the EGR gas in non-regeneration time of the particulate filter, during which the particulate filter is not regenerated by the regeneration control means. Based on at least one of the temperature of the intake air and the load state of the internal combustion engine, the non-regeneration time EGR control means controls one of: the quantity of the EGR gas, which passes the main passage, and the quantity of the EGR gas, which passes the bypass passage; and the ratio between the EGR gas, which passes the main passage, and the EGR gas, which passes the bypass passage.

The control means may include an EGR stop means for stopping the EGR operation. The EGR stop means may be included into one of the regeneration time control means and the non-regeneration time control means. The EGR stop means may stop the EGR operation upon satisfaction of at least one of the following conditions: the temperature of the exhaust gas, which is outputted from the internal combustion engine, is predicted to exceed a predetermined temperature; and a combustion state of the internal combustion engine is predicted to be unstable. Also, the EGR stop means may determine whether the EGR operation needs to be stopped based on at last one of the temperature of the intake air and a load state of the internal combustion engine. The EGR stop means may determine whether the EGR operation needs to be stopped based on at least one of fuel injection timing, a post fuel injection quantity and a fuel injection pattern of the internal combustion engine. Furthermore, the EGR stop means may stop the EGR operation when three or more fuel injections are performed per fuel injection cycle in each cylinder of the internal combustion engine.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
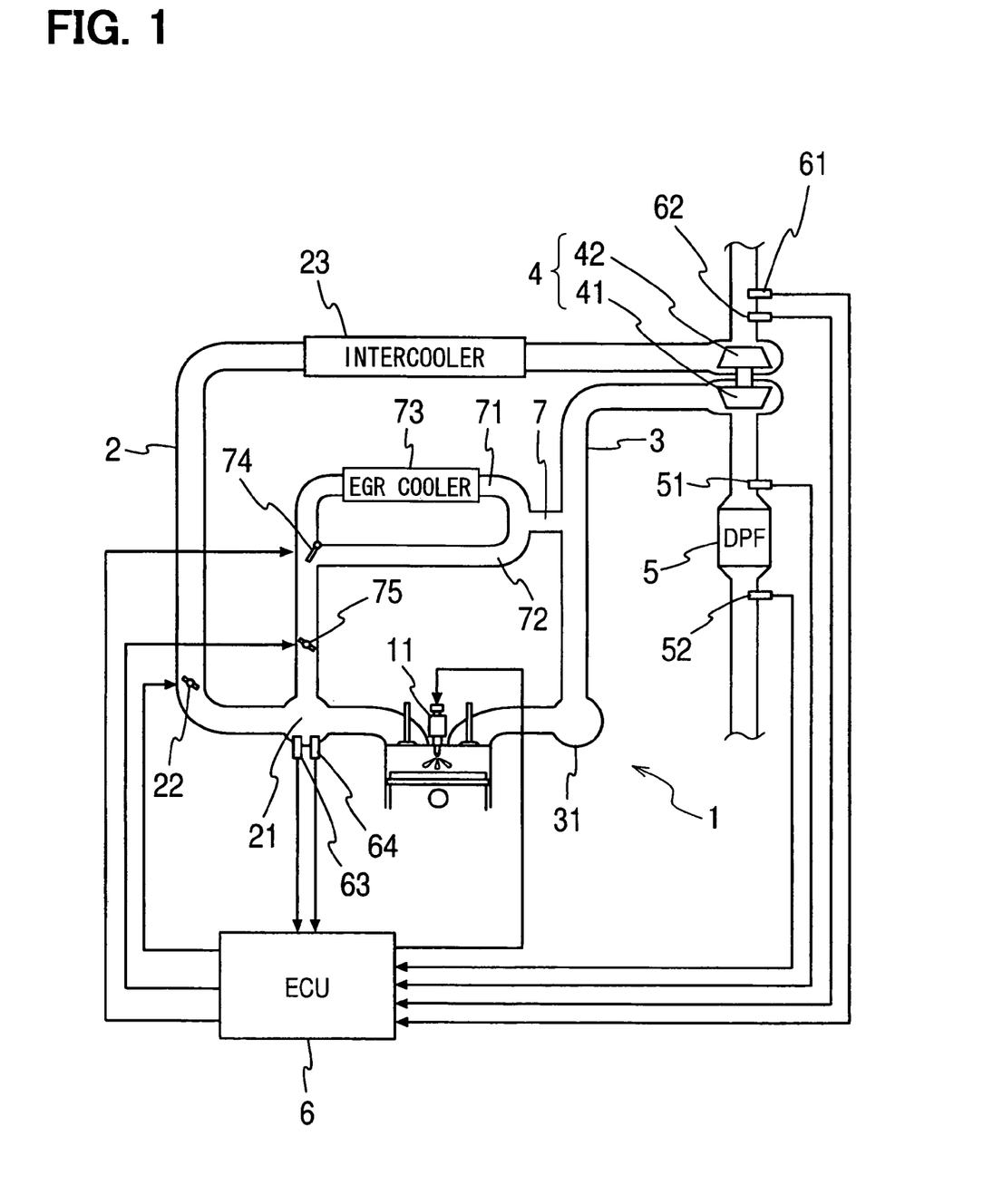
FIG. 1 is a schematic diagram showing an entire structure of an exhaust gas purifying apparatus according to an embodiment of the present invention.

An embodiment of the present invention will be described with reference to the accompanying drawings. FIG. 1 shows an entire structure of an exhaust gas purifying apparatus for an internal combustion engine, more particularly a diesel engine 1. Combustion chambers of cylinders (only one cylinder depicted in FIG. 1) are connected to an intake air passage 2 and an exhaust gas passage 3 through an intake manifold 21 and an exhaust manifold 31, respectively. An injector 11, which is connected to a fuel supply arrangement (not shown), is provided in each combustion chamber and is driven by an ECU 6 at predetermined timing to inject high pressure fuel into the combustion chamber.

A centrifugal supercharger 4 is provided to the engine 1. A turbine 41 of the centrifugal supercharger 4 is arranged in the exhaust gas passage 3, and a compressor 42 of the centrifugal supercharger 4 is arranged in the intake air passage 2. The turbine 41 and the compressor 42 are connected to each other through a turbine shaft. In the centrifugal supercharger 4, the turbine 41 is driven by thermal energy of the exhaust gas, and the compressor 42 is driven by the turbine 41 through the turbine shaft. Thus, the intake air to be introduced into the intake air passage 2 is compressed by the compressor 42 and is supplied to the combustion chamber of each cylinder. An intercooler 23 is arranged in the intake air passage 2 to cool the hot intake air, which is compressed by the compressor 42. A throttle 22 is arranged on a downstream side of the intercooler 23 to adjust a flow rate of the intake air, which is supplied to the intake manifold 21, based on a command supplied from the ECU 6.

A diesel particulate filter (DPF) 5 is arranged on a downstream side of the turbine 41 in the exhaust gas passage 3. The DPF 5 is a ceramic filter of a known structure. For example, the DPF 5 may have a honeycomb structure made from a refractory ceramics, such as cordierite. Cells of the honeycomb structure of the DPF 5, which form gas flow passages, are arranged and are sealed in such a manner that inlets and outlets of the cells are alternately arranged. The exhaust gas, which is outputted from the engine 1, passes through porous partition walls of the DPF 5 and flows downward. Therefore, particulates, or particulate matter (PM), contained in the exhaust gas can be collected by the porous partition walls of the DPF 5. Generally, oxidation catalyst is held on the surface of the DPF 5 to catalytically combust hydrocarbons (HC) contained in the exhaust gas and thereby to increase the temperature of the exhaust gas, resulting in an increase in the temperature of the DPF 5. Alternatively, the oxidation catalyst may be provided separately on the upstream side of the DPF 5. Exhaust gas temperature sensors 51, 52 are provided on upstream and downstream sides, respectively, of the DPF 5 in the exhaust gas passage 3 to measure the upstream and downstream side exhaust gas temperatures, respectively. Output signals of the exhaust gas temperature sensors 51, 52 are supplied to the ECU 6.

The intake air passage 2 and the exhaust gas passage 3 are connected with each other through an EGR passage 7, so that a portion of the exhaust gas is returned to the air intake side of the engine 1 through the EGR passage 7. One end of the EGR passage 7 is communicated with a portion of the exhaust gas passage 3 located between the exhaust manifold 31 and the turbine 41, and the other end of the EGR passage 7 is communicated with the intake manifold 21. An intermediate portion of the EGR passage 7 is branched into a main passage 71 and a bypass passage 72, which then merge with each other at downstream ends thereof and are connected to the intake manifold 21. An EGR cooler 73 is arranged in the main passage 71. The bypass passage 72 bypasses the EGR cooler 73 and is connected to the intake air passage 2. The EGR cooler 73 may have a known structure, which uses engine coolant. For example, a passage, which conducts the engine coolant, may be placed adjacent to a passage, which conducts the EGR gas, to exchange the heat therebetween and thereby to cool the EGR gas.

An EGR gas switch valve (a valve member) 74 is arranged at a connection between the downstream end of the main passage 71 and the downstream end of the bypass passage 72 to linearly vary an opening degree (a degree of opening) of the main passage 71 and an opening degree (a degree of opening) of the downstream end of the bypass passage 72. In this way, a mixing ratio between the cooled EGR gas, which passes the main passage 71, and the hot EGR gas, which passes the bypass passage 72, is freely adjustable to control the temperature of the EGR gas supplied to the intake manifold 21. An EGR valve 75 is provided between the intake manifold 21 and the connection between the downstream end of the main passage 71 and the downstream end of the bypass passage 72. An opening degree of the EGR valve 75 is linearly adjustable to freely adjust a flow rate of the EGR gas, which is recirculated into the intake air passage 2. Each of the EGR gas switch valve 74 and the EGR valve 75 is driven by a corresponding command signal outputted from the ECU 6.

An intake air pressure sensor 63 for measuring an intake air pressure (a pressure of the intake air) and an intake air temperature sensor 64 for measuring an intake air temperature (a temperature of the intake air) are provided to the intake manifold 21. Outputs of these sensors 63, 64 are supplied to the ECU 6. Furthermore, a fresh air temperature sensor 61 for sensing a temperature of newly introduced fresh air and an airflow meter 62 for measuring an intake air quantity (a quantity of the intake air or a flow rate of the intake air) are arranged in the intake air passage 2 on an upstream side of the compressor 42 of the centrifugal supercharger 4. The temperature of the fresh air and the intake air quantity, which are measured by the air temperature sensor 61 and the airflow meter 62, are outputted to the ECU 6.

Other undepicted sensors, such as an accelerator opening degree sensor (an accelerator pedal position sensor), an engine rotational speed (rpm) sensor, a coolant temperature sensor, are also connected to the ECU 6. The ECU 6 determines an operational state of the engine 1 based on measured signals of these sensors. Then, the ECU 6 computes suitable operational command values, such as the fuel injection quantity, the fuel injection timing and the fuel injection pressure, based on a demand of the engine 1, which is determined according to the operational state of the engine 1, to control, for example, the injectors 11 and the throttle 22 and thereby to control the fuel injection. Furthermore, the ECU 6 controls regeneration of the DPF 5 based on the engine operational state and the various sensor outputs and thereby serves as a regeneration control means. Also, the ECU 6 controls the temperature and the flow rate of the EGR gas, which is recirculated into the intake air passage 2 through the EGR passage 7, by adjusting the opening degree of the EGR gas switch valve 74 and the opening degree of the EGR valve 75, so that the ECU 6 also serves as an EGR control means, and the opening degree of EGR gas switch valve 74 and the opening degree of the EGR valve 75 are collectively referred as a degree of the EGR operation, which is controlled by the EGR control means based on the degree of progress of warming up of the engine 1 indicated by, for example, the intake air temperature and the engine load state.

First, the regeneration control means of DPF 5 will be described. The ECU 6 measures a PM accumulation amount, which is an amount of the PM accumulated on the DPF 5. Based on the measured PM accumulation amount, when the ECU 6 determines that the PM accumulation amount is equal to or greater than a predetermined value, the ECU 6 initiates the regeneration of the DPF 5 and thereby increases the temperature of the DPF 5 to combust and to remove the particulates from the DPF 5. Specifically, for example, based on the engine operational state, which is determined based on the various sensor outputs, the ECU 6 may determine a PM output amount, which is an amount of the PM outputted from the cylinders. Then, the ECU 6 may estimate the PM accumulation amount by cumulating the PM output amount. Alternatively, based on the fact that a pressure difference between the upstream side and the downstream side of the DPF 5 increases under a constant exhaust gas flow rate when the PM accumulation amount is increased, a differential pressure sensor may be provided to measure the pressure difference between the upstream side and the downstream side of the DPF 5. Based on the measurement of the differential pressure sensor, the ECU 6 may estimate the PM accumulation amount. A temperature increasing means for increasing the temperature of the DPF 5 is operated to make an output of the exhaust gas temperature sensor 51 or of the exhaust gas temperature senor 52 equal to a predetermined target temperature (500 to 650 degrees Celsius) to combust the accumulated particulates.

The temperature increasing means may be implemented by substantial retardation of main fuel injection timing, by a single post fuel injection for injecting a small quantity of fuel after the main fuel injection or by multiple post fuel injections for injecting a small quantity of fuel after the main fuel injection. Through the above operation(s), the temperature of the exhaust gas, which is supplied to the DPF 5, may be increased to the high temperature, or the uncombusted HC, which is supplied to the exhaust gas passage 3, may be increased. In this way, due to the heat of reaction, which is generated by the oxidation catalyst, the temperature of the DPF 5 can be increased to the combustion temperature of the particulates. The temperature increasing means may be implemented by any other ways, or the temperature increasing means may be implemented by only one or more of the above operations.

In non-regeneration time of the DPF 5 (time of not regenerating the DPF 5), the EGR control means executes a normal EGR control operation based on the engine operational state and thereby serves as a non-regeneration time EGR control means. In regeneration time of the DPF 5 (time of regenerating the DPF 5), the EGR control means executes a regeneration-preferential EGR control operation for preferentially executes the regeneration of the DPF 5 and thereby serves as a regeneration time EGR control means. That is, when the regeneration of the DPF 5 is not executed, the EGR gas switch valve 74 and the EGR valve 75 are operated based on the engine operational state, which is determined based on the various sensor outputs, in such a manner that the best EGR ratio and the best EGR temperature for reducing the output quantity of NOx, which is outputted from the engine 1, are achieved. Here, the EGR temperature can be adjusted to a target temperature by adjusting a mixing quantity of the cooled EGR gas, which passes through the main passage 71, and a mixing quantity of the hot EGR gas, which passes through the bypass passage 72, and/or by adjusting a ratio between the cooled EGR gas, which passes through the main passage 71, and the hot EGR gas, which passes through the bypass passage 72. This adjustment of the cooled EGR gas and the hot EGR gas is performed based on a control state of the EGR gas switch valve 74, which is determined based on the intake air temperature (e.g., the fresh air temperature) and the engine load.

During the regeneration of the DPF 5, the EGR gas switch valve 74 and the EGR valve 75 are operated in such a manner that the temperature of the exhaust gas, which is supplied to the DPF 5 upon the recirculation of the EGR gas, is adjusted to or becomes the suitable temperature that is suitable for the regeneration of the DPF 5. Specifically, the control state of the EGR gas switch valve 74 is determined based on the engine operational state, such as the intake air temperature (the fresh air temperature) and the engine load. Here, the engine operational state is determined based on the various sensor outputs, and the EGR gas switch valve 74 is operated based on the above determined target control state of the EGR gas switch valve 74. Thus, the mixing quantities (a mixing ratio) of the cooled EGR gas passing through the main passage 71 and of the hot EGR gas passing through the bypass passage 72 are adjusted to adjust the temperature of the EGR gas, which is recirculated into the intake passage 2 in the regeneration time of the DPF 5, to the target temperature. The target temperature is set based on the operational state in such a manner that an increase in the exhaust gas temperature is achieved by the EGR, and the temperature of the EGR gas does not exceed an allowable temperature, which is determined based on the tolerable upper limit temperature of the EGR valve 75 (the member or component arranged in the EGR passage). In this way, the EGR gas, which passes through the EGR valve 75, can be controlled within the range that allows maintenance of the reliability of the EGR valve 75.

However, in a low load operational state, the combustion becomes substantially moderate, and thereby the combustion is carried out in such a manner that the exhaust gas temperature is forcefully increased. Thus, the combustion becomes unstable, and therefore the large quantity of the uncombusted HC may be generated. In this state, when the quantity of EGR gas is increased, a deposit tends to be formed in the EGR cooler 73 and the EGR valve 75 to cause a reduction in the cooler efficiency or to cause valve fastening. Thus, there is implemented a function (an EGR stop means) for outputting a closing command and to close the EGR valve 75 when the amount of uncombusted HC is relatively large to cause deterioration of the reliability of the EGR cooler 73 and/or the EGR valve 75. Furthermore, in a high load operational state, the exhaust gas temperature is relatively high, and thereby even when the EGR cooler 73 is operated to cool the exhaust gas, the temperature of the EGR gas could not be sufficiently reduced in some cases. In such a case, the EGR operation is not performed to maintain the reliability of the EGR valve 75.

Figure 2:
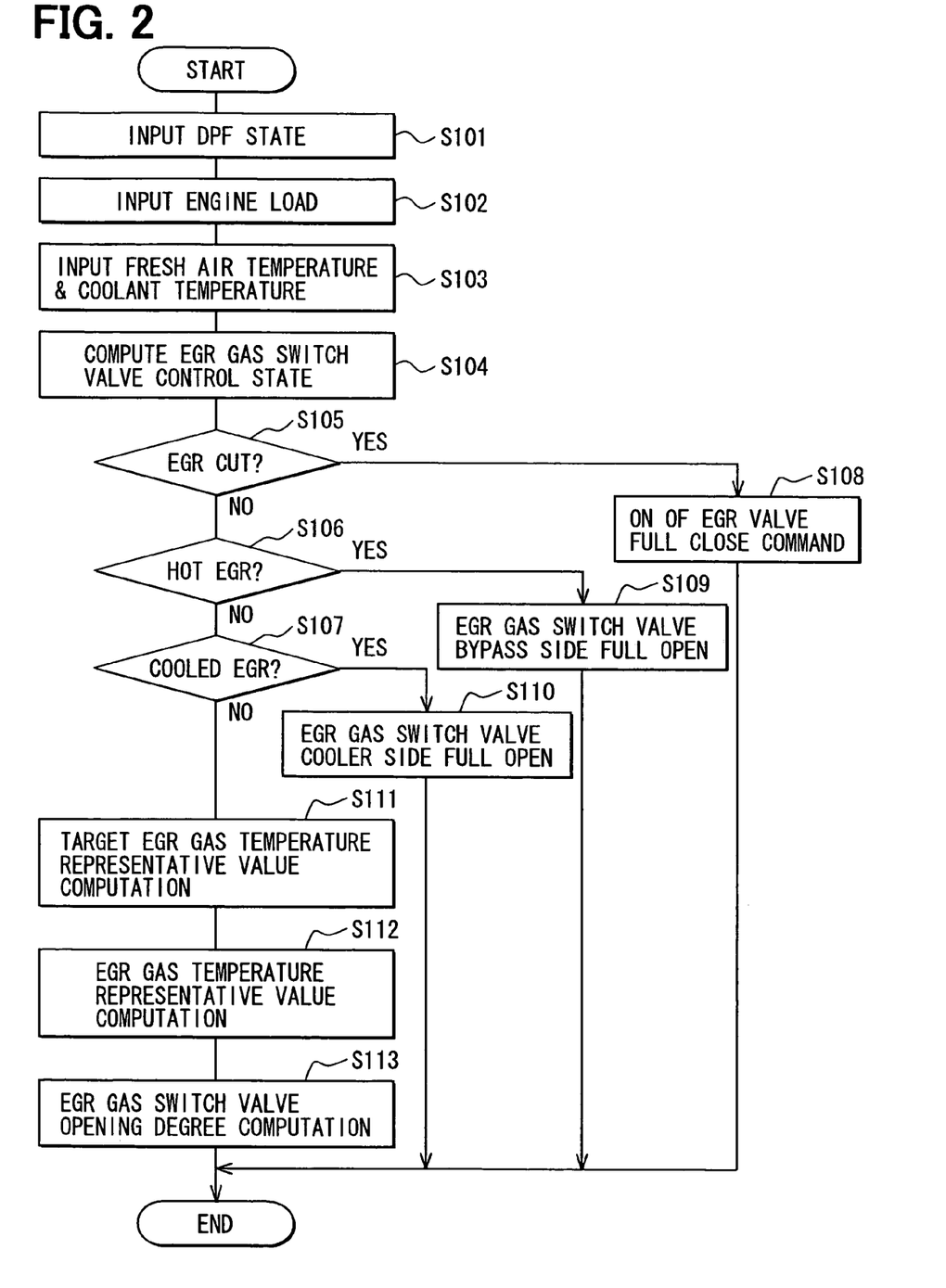
FIG. 2 is a flowchart showing a control operation of an EGR switch valve and an EGR valve, which is executed in an ECU of the exhaust gas purifying apparatus.

Next, the EGR control operation of the present embodiment will be described with reference to FIGS. 2 to 10 in detail. FIG. 2 shows a flowchart for the control operation of the EGR switch valve 74 and of the EGR valve 75 executed by the ECU 6. First, at step S101, a result of determination of whether the DPF 5 is in the regeneration state is inputted. In the determination of the regeneration state of the DPF 5, for example, a regeneration determination result obtained in a regeneration control process of the DPF 5 executed in another routine can be used. In the regeneration control process of the DPF 5, the regeneration determination is carried out by comparing a measured value of the PM accumulation amount of the DPF 5 with a predetermined regeneration start PM accumulation amount. More specifically, when the measured value of the PM accumulation amount of the DPF 5 exceeds the predetermined regeneration start PM accumulation amount, it is determined that the regeneration of the DPF 5 is required. Thus, the temperature increasing means is operated to start the regeneration of the DPF 5.

Figure 3:
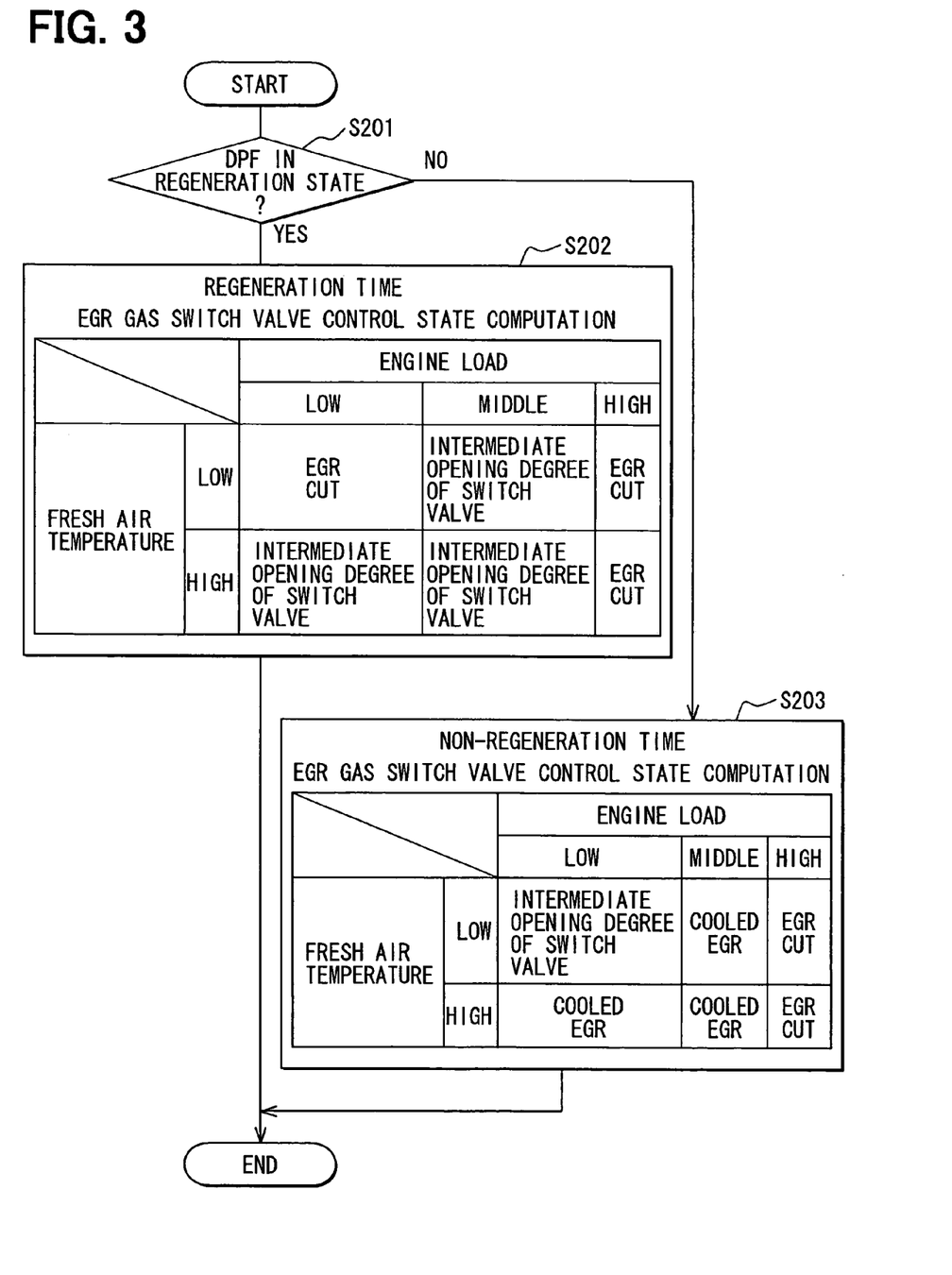
FIG. 3 is a flowchart showing computation of a control state of the EGR gas switch valve.

Next, at step S102, an engine load state (state of the load of the engine) is inputted. In general, the engine load state is expressed by a function, such as a requested torque, an actual fuel injection quantity, an engine rotational speed (rpm). At step S103, the fresh air temperature, which is outputted from the fresh air temperature sensor 61, and the engine coolant temperature, which is outputted from the coolant temperature sensor (not shown), are obtained. At step S104, a control state of the EGR gas switch valve 74 is computed based on the input values obtained at steps S101 to S103. Details of this step are depicted in FIG. 3. First, at step S201 of FIG. 3, it is determined whether the DPF 5 is in the regeneration state based on the DPF regeneration state, which is inputted at step S101 of FIG. 2. When it is determined that the DPF 5 is in the regeneration state at step S201, control proceeds to step S202. In contrast, when it is determined that the DPF 5 is not in the regeneration state, i.e., the DPF 5 is in the non-regeneration state at step S201, control proceeds to step S203.

At step S202, with reference to a map, which is prepared based on the engine load state and the fresh air temperature, the control of the EGR gas switch valve 74 at the time of regeneration is determined. More specifically, it is determined which one of the EGR cut and an intermediate opening degree of the EGR gas switch valve 74 is implemented. In the present embodiment, the engine load state is classified into three ranges, i.e., a low load range, a middle load range and a high load range, and the fresh air temperature is classified into two ranges, i.e., a low temperature range and a high temperature range. Furthermore, an EGR gas switch valve control state map for achieving the best operational state in each condition is prepared through experiments and is stored in the ECU 6. Specifically, when the engine 1 is operated in the low load range, and the fresh air temperature is in the low temperature range, an excessive amount of HC could possibly be released in the exhaust gas. Thus, in such a condition, the EGR is cut to limit generation of deposits in the EGR cooler 65 and the EGR valve 75. In contrast, when the engine 1 is operated in the high load range to generate the high temperature EGR gas, the high temperature EGR gas could possibly pose negative influences on the material(s) of the EGR valve 75. Thus, in such a condition (in both the low and high fresh air temperature ranges at the high load range), the EGR is cut to limit deterioration of the reliability of the EGR valve 75. In the condition of the middle load range and the low fresh air temperature range, in the condition of the middle load range and the high fresh air temperature range, and in the condition of the low load range and the high fresh air temperature range, the EGR gas switch valve 74 is controlled to have the intermediate opening degree. The intermediate opening degree of the EGR gas switch valve 74 is variable, and a way of computing the valve opening degree will be described below.

At step S203, with reference to the map, which is prepared based on the engine load state and the fresh air temperature, the control of the EGR gas switch valve 74 at the time of non-regeneration is determined. More specifically, it is determined which one of the EGR cut, the cooled EGR and the intermediate opening degree of the EGR gas switch valve 74 is implemented. In the present embodiment, similar to the time of regeneration, the engine load state is classified into three ranges, i.e., the low load range, the middle load range and the high load range, and the fresh air temperature is classified into two ranges, i.e., the low temperature range and the high temperature range. Furthermore, an EGR gas switch valve control state map for achieving the best operational state in each condition is prepared through experiments and is stored in the ECU 6. Specifically, in the case where the engine 1 is operated in the low load range, and the fresh air temperature is in the low temperature range, when the EGR gas temperature becomes low, the HC tends to be generated. Thus, in order to increase the EGR gas temperature, the EGR gas switch valve 74 is controlled to have the intermediate opening degree. In contrast, in the condition of the middle load range and the low temperature range, in the condition of the middle load range and the high temperature range and in the condition of the low load range and the high fresh air temperature range, the cooled EGR is provided through the EGR cooler 73 to improve the EGR efficiency. When the engine 1 is operated in the high load range, like at the time of the regeneration of the DPF 5, the EGR is cut to maintain the reliability of the EGR valve 75.

It should be noted that the engine load ranges (the low load range, the middle load range and the high load range) and the fresh air temperature ranges (the low temperature range and the high temperature range) of step S202 need not be the same as those of step S203. Desirably, these ranges should be individual set for each of the time of non-regeneration and the time of regeneration to achieve the best result.

Figure 4:
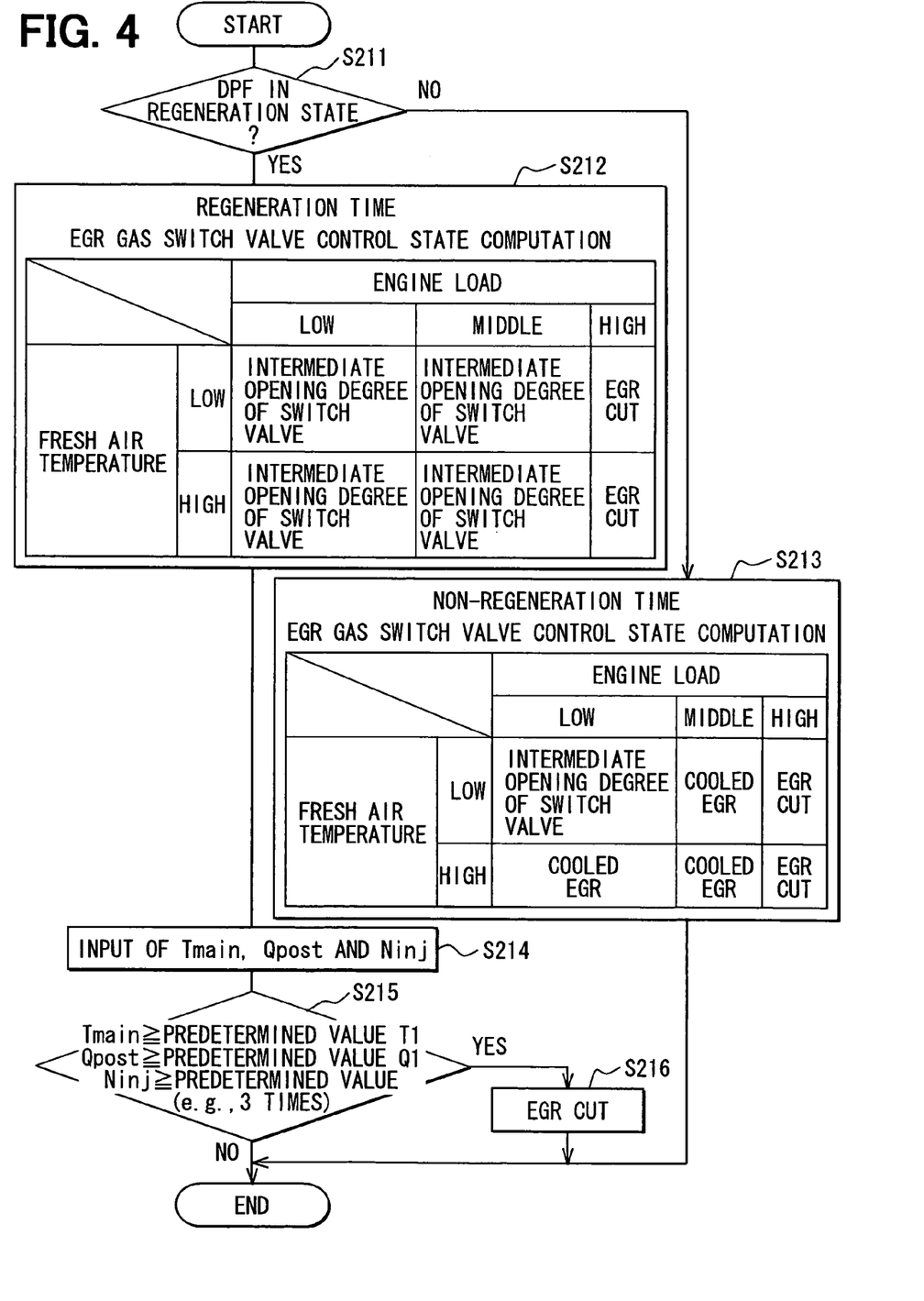
FIG. 4 is a flowchart showing another example of the computation of the control state of the EGR gas switch valve.

Furthermore, as shown in FIG. 4, execution of the EGR cut at the time of regeneration may be determined based on the operational state of the engine 1 in such a manner that when the engine 1 is operated in the state, which causes generation of the HC beyond the predetermined quantity, the EGU is cut. This exemplary case will be described with reference to FIG. 4. First, at step S211 of FIG. 4, like step S201, it is determined whether the DPF 5 is in the regeneration state. When it is determined that the DPF 5 is in the regeneration state at step S211, control proceeds to step S212. In contrast, when it is determined that the DPF 5 is in the non-regeneration state at step S211, control proceeds to step S213.

At step S212, with reference to a map, which is prepared based on the engine load state and the fresh air temperature, the control of the EGR gas switch valve 74 at the time of regeneration is determined. More specifically, it is determined which one of the EGR cut and an intermediate opening degree of the EGR gas switch valve 74 is implemented. In the present example, the EGR is cut only when the engine 1 is operated in the high load range. In the low load range and the middle load range, the EGR gas switch valve 74 is controlled to have the intermediate opening degree. Then, control proceeds to step S214, and main fuel injection timing Tmain, a post fuel injection quantity Qpost and a fuel injection frequency (a fuel injection number per fuel injection cycle or a number of fuel injections per fuel injection cycle) Ninj are inputted. These values are computed through a fuel injection control and DPF regeneration control routine (not shown).

At step S215, it is determined whether the main fuel injection timing Tmain is equal to or greater than a predetermined value T1, or whether the post fuel injection quantity Qpost is equal to or greater than a predetermined value Q1, or whether the injection frequency Ninj is equal to or greater than a predetermined value (e.g., three times). When the answer of any one of these three inquires is YES, control proceeds to step S216, and the control state of EGR gas switch valve 74 is changed to the EGR cut. When all of the answers of the three inquires at step S216 are NO, the control state of the EGR gas switch valve 74 is kept in the intermediate opening degree, and the current process ends.

As discussed above, when the state of generating the excessive amount of HC during the regeneration of the DPF 5 is determined based on the main fuel injection timing Tmain, the post fuel injection quantity Qpost and the injection frequency Ninj, and the EGR cut is executed, the deposits can be reliably limited. Furthermore, even in the condition of the low load range and the low fresh air temperature range, when the quantity of the HC to be generated is predicted to be equal to or less than a predetermined value, the temperature increasing effect by the EGR at the time of regeneration of the DPF 5 can be obtained upon executing the EGR. The computation of the control state of the EGR gas switch valve 74 in the non-regeneration time at step S213 is the same as that of step S203 of FIG. 3 and will not be described further.

Figure 5A:
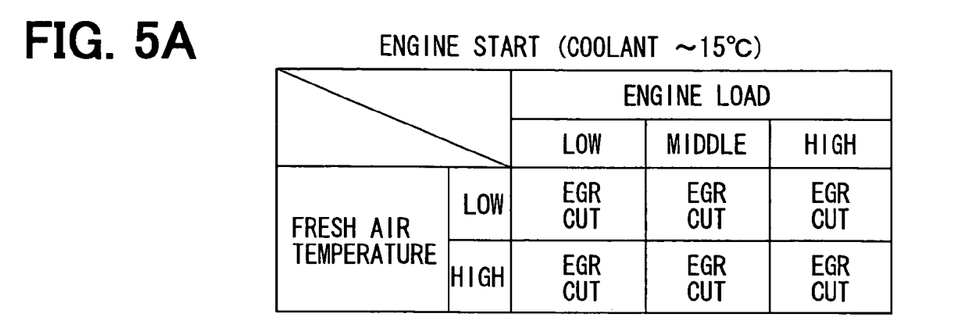
FIGS. 5A–5D are diagrams showing details of the EGR gas switch valve control in non-regeneration time.
Figure 5B:
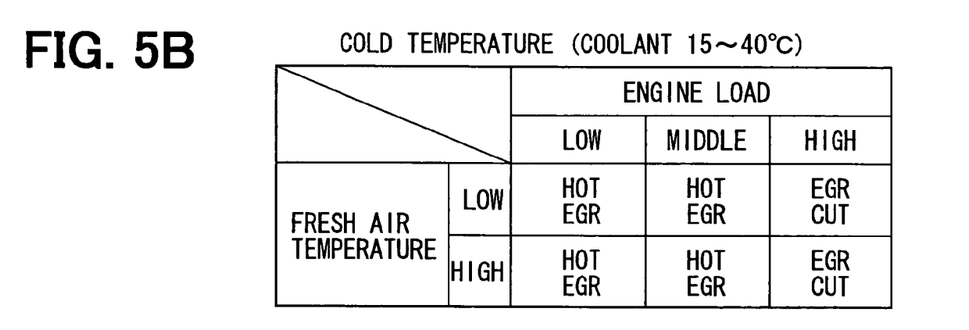
Figure 5C:
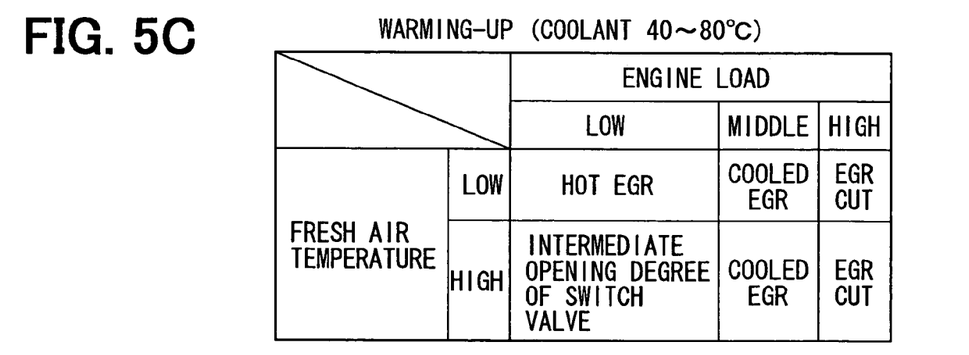
Figure 5D:
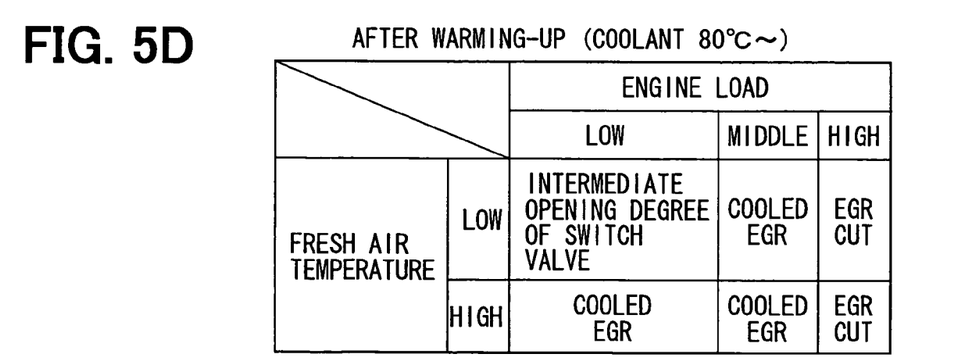

FIGS. 5A to 5D show details of the control operation of the EGR gas switch valve 74 in the non-regeneration time. In this control operation, a control state of the EGR gas switch valve 74 is determined based on the engine coolant temperature. Specifically, FIG. 5A shows the control operation at the time of engine start (the coolant temperature being below 15 degrees Celsius). In this low coolant temperature range, the combustion is not stable, so that the EGR is cut regardless of the fresh air temperature and the engine load. FIG. 5B shows the control operation at the time of cold temperature (the coolant temperature being in a range of 15–40 degrees Celsius). In this coolant temperature range, the combustion right after the stating of the engine is still unstable. Thus, in the low and middle load ranges, the hot EGR is used. Specifically, the EGR cooler 73 is bypassed, and the EGR gas of the relatively high temperature is supplied. When the engine 1 is operated in the high load range, the EGR is cut to maintain the reliability of the EGR valve 75. FIG. 5C shows the control operation at the time of warming-up of the engine 1 (the coolant temperature being in a range of 40–80 degrees Celsius). In this coolant temperature range, the combustion is stabilized due to the warming-up of the engine 1. Thus, in the middle load range, the cooled EGR (the operation of the cooled EGR) for cooling the EGR gas is executed to reduce the NOx. In the condition of the low load range and low fresh air temperature range, the hot EGR (the operation of the hot EGR) is executed. Furthermore, in the condition of the low load range and the high fresh air temperature range, the intermediate opening degree of the EGR gas switch valve 74 is implemented. In the high load range, the EGR is cut (the operation of EGR cut). FIG. 5D shows the control operation after the warming-up of the engine 1 (the coolant temperature being above 80 degrees Celsius), and this control operation is the same as that of the EGR gas switch valve 74 in the non-regeneration time shown in FIGS. 3 and 4.

It should be noted that the engine load ranges (the low load range, the middle load range and the high load range) and the fresh air temperature ranges (the low temperature range and the high temperature range) of FIGS. 5A–5D need not be identical to each other and may vary from one of FIGS. 5A–5D to another one of FIGS. 5A–5D. Desirably, these ranges should be individually set for each of the time to achieve the best result. Furthermore, in stead of dividing the ranges as the temperature ranges shown in FIGS. 5A–5D, it is possible to use a function of the temperature as a criterion for dividing the ranges.

At step S105 of FIG. 2, it is determined whether the EGR cut needs to be executed based on the control state of the EGR gas switch valve 74, which is computed according to the flowchart shown in FIG. 3. When the answer to the inquiry at step S105 is YES, control proceeds to step S108 where an EGR valve 75 full close command for fully closing the EGR valve 75 is turned on or is outputted. When the ECU 6 executes a valve opening degree control process (not shown) of the EGR valve 75, the ECU 6 stops the EGR based on the EGR valve full close command of step S108. When the answer to the inquiry at step S105 is NO, control proceeds to step S106. At step S106, it is determined whether the hot EGR needs to be executed. When the answer to the inquiry at step S106 is YES, control proceeds to step S109. At step S109, the EGR gas switch valve 74 is controlled, so that the bypass passage 72 is fully opened while the main passage 71 is fully closed. When the answer to the inquiry at step S106 is NO, control proceeds to step S107. At step S107, it is determined whether the cooled EGR needs to be executed. When the answer to the inquiry at step S107 is YES, control proceeds to step S110. At step S110, the EGR gas switch valve 74 is controlled such that the main passage 71 is fully opened while the bypass passage 72 is fully closed.

Figure 6:
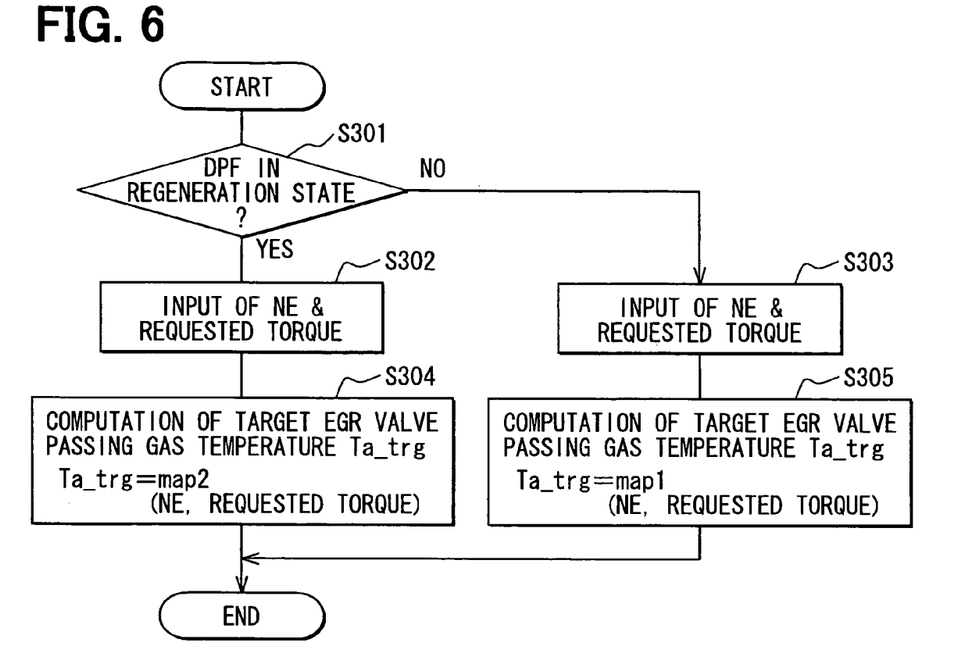
FIG. 6 is a flowchart showing computation of a target EGR valve passing gas temperature.

When the answer to the inquiry at step S107 is NO, control proceeds to step S111. At step S111, a target EGR gas temperature representative value is computed. For example, a target EGR valve 75 passing gas temperature (a target temperature of gas that passes through the EGR valve 75) or a target intake air temperature upon merging of the EGR gas into the intake air may be used as the target EGR gas temperature representative value. FIG. 6 shows the case where the target EGR valve 75 passing gas temperature is used as the target EGR gas temperature representative value. With reference to FIG. 6, at step S301, it is determined whether the DPF 5 is in the regeneration state. When it is determined that the DPF 5 is in the regeneration state at step S301, control proceeds to step S302. In contrast, when it is determined that the DPF 5 is not in the regeneration state, i.e., the DPF 5 is in the non-regeneration state at step S301, control proceeds to step S303. At step S302, the rotational speed (rpm) NE of the engine 1 and the requested torque are inputted, and control proceeds to step S304. At step S304, a target EGR valve 75 passing gas temperature (a target temperature of gas that passes through the EGR valve 75) Ta_trg is computed. The target EGR valve 75 passing gas temperature Ta_trg may be computed based on a two dimensional map (map2) showing a relationship between the rotational speed NE and the requested torque, as indicated by the following equation (1).

$$Ta\_trg = map2(NE, \text{Requested Torque}) \quad \text{Equation (1)}$$

Here, map2 is a value, which is adapted in advance through, for example, experiments such that the EGR gas temperature in the regeneration time is in a predetermined range, which achieves the reliability of the EGR valve 75, and is relatively high to achieve the temperature increasing effect.

At step S303, the rotational speed NE of the engine 1 and the requested torque are inputted, and control proceeds to step S305. At step S305, the target EGR valve 75 passing gas temperature Ta_trg is computed. The target EGR valve 75 passing gas temperature Ta_trg may be computed based on a two dimensional map (map1) showing a relationship between the rotational speed NE and the requested torque, as indicated by the following equation (2).

$$Ta\_trg = map1(NE, \text{Requested Torque}) \quad \text{Equation (2)}$$

Here, map1 is a value, which is adapted in advance thorough experiments such that the EGR gas temperature in the non-regeneration time results in minimization of the quantity of HC, which is outputted along with the exhaust gas.

Figure 7:
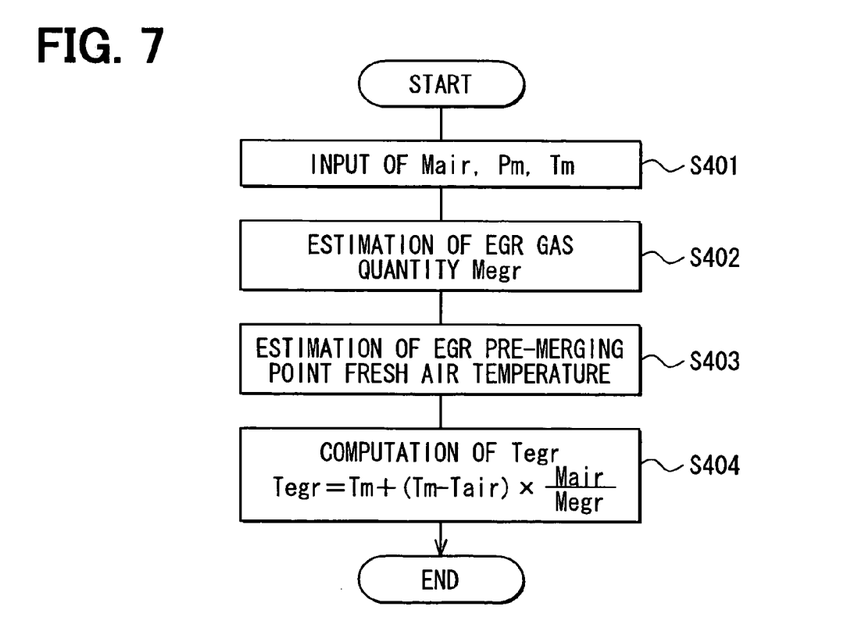
FIG. 7 is a flowchart showing computation of an estimated EGR valve passing gas temperature value.

At step S112 of FIG. 2, the EGR gas temperature representative value is computed. For example, an estimated value of the EGR valve 75 passing gas temperature or a measured value of the intake air temperature sensor 64, which indicates the intake air temperature upon merging of the EGR gas into the intake air, may be used as the EGR gas temperature representative value. FIG. 7 shows the case where the estimated value of the EGR valve 75 passing gas temperature is used as the EGR gas temperature representative value. With reference to FIG. 7, at step S401, a fresh air quantity Mair, an intake air pressure Pm and an intake air temperature Tm are inputted. Here, the fresh air quantity Mair is obtained based on an airflow meter 62 output value (a measured output value of the airflow meter 62), and the intake air pressure Pm is obtained based on an intake air pressure sensor 63 output value (a measured output value of the intake air pressure 63). Also, the intake air temperature Tm is obtained based on an intake air temperature sensor 64 output value. Then, at step S402, an EGR gas quantity Megr is estimated based on the fresh air quantity Mair, the intake air pressure Pm and the intake air temperature Tm.

Figure 8:
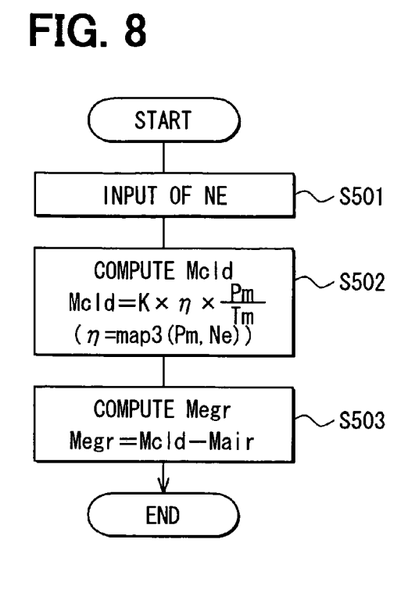
FIG. 8 is a flowchart showing computation of an EGR gas quantity.

FIG. 8 shows an exemplary estimation of the EGR gas quantity Megr. At step S501 of FIG. 8, the engine rotational speed NE is inputted. Then, at step S502, a cylinder inflow gas quantity Mcld is computed according to the following equation (3).

$$Mcld = K \times \eta \times (Pm/Tm) \quad \text{Equation (3)}$$

Here, $\eta$ is an air intake efficiency, which can be computed through use of a two dimensional map (map3), which is prepared in advance and indicates a relationship between the intake air pressure Pm and the engine rotational speed Ne. K is a constant. Next, at step S503, the EGR gas quantity Megr is computed by subtracting the fresh air quantity Mair from the cylinder inflow gas quantity Mcld through use of the following equation (4).

$$Megr = Mcld - Mair \quad \text{Equation (4)}$$

Figure 9:
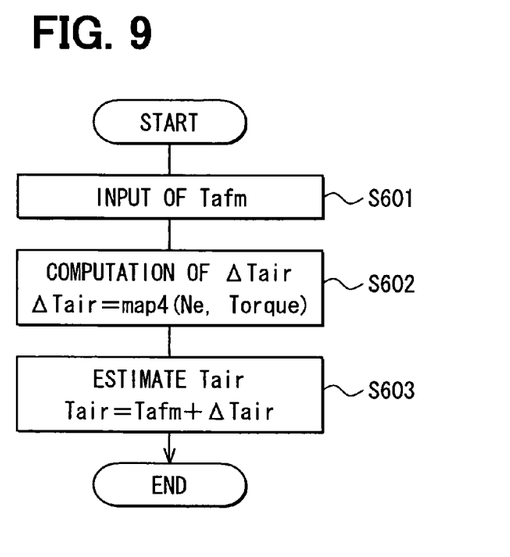
FIG. 9 is a flowchart showing computation of an EGR pre-merging point fresh air temperature.

Next, at step S403 of FIG. 7, an EGR pre-merging point fresh air temperature (a temperature of fresh air at an upstream point that is upstream of the EGR merging point where the EGR gas is merged to the fresh air) Tair is estimated. FIG. 9 shows an exemplary estimation of the EGR pre-merging point fresh air temperature Tair. First, at step S601, the fresh air quantity Tafm is inputted based on the engine rotational speed Ne and the fresh air temperature sensor 61 output value. Then, at step S602, these input values are applied to the following equation (5) to compute a compressor 42 to intercooler 23 intermediate point temperature change amount (an amount of change in the temperature at the intermediate point between the compressor 42 and the intercooler 23) ΔTair.

$$\Delta Tair = map4\ (NE, Torque) \quad (5)$$

The temperature change amount ΔTair is a value that is adapted in each operational state (NE, Torque). The EGR pre-merging point fresh air temperature Tair is estimated based on the temperature change amount ΔTair at step S603 through use of the following equation (6).

$$Tair = Tafm + \Delta Tair \quad (6)$$

At step S404 of FIG. 7, the EGR valve 75 passing gas temperature estimated value Tegr is computed based on the results of FIGS. 8 and 9 through use of the following equation (7), thereby serving as an estimating means for estimating the EGR valve passing gas temperature.

$$Tegr = Tm + (Tm - Tair) \times (Mair/Megr) \quad \text{Equation (7)}$$

The equation (7) is a transformation of the following equation.

Fresh Air Temperature Tair×Fresh Air Quantity Mair+EGR Gas Quantity×EGR Gas Temperature Tegr=(Fresh Air Quantity Mair+EGR Gas Quantity)×Intake Air Temperature At step S113 of FIG. 2, a valve opening degree of the EGR gas switch valve 74 is computed.

Figure 10:
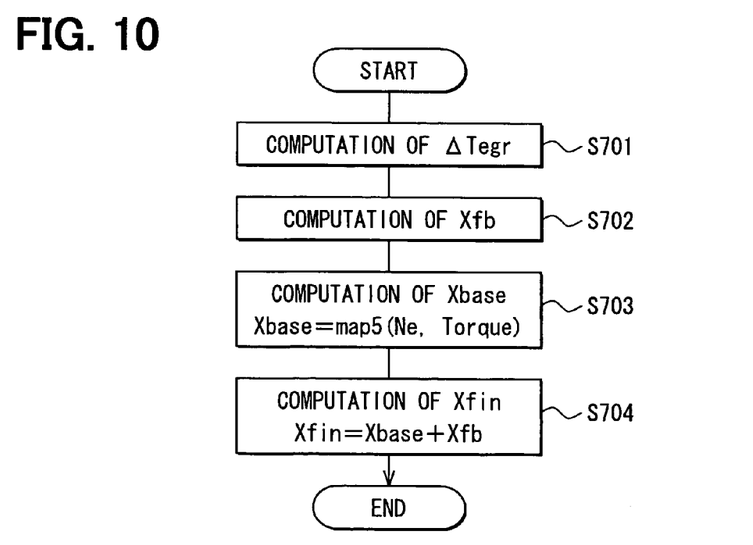
FIG. 10 is a flowchart showing computation of a corrected EGR gas switch valve opening degree.

FIG. 10 shows the details of this computation. At step S701 of FIG. 10, a temperature deviation ΔTegr is computed based on the target EGR gas temperature representative value (the target EGR valve 75 passing gas temperature) computed at step S111 of FIG. 2 and the EGR gas temperature representative value (the EGR valve 75 passing gas temperature estimated value) computed at step S112 of FIG. 2. Then, at step S702, an EGR gas temperature feedback amount Xfb is computed. The EGR gas temperature feedback amount Xfb can be computed through use of a known PID control, which is based on the temperature deviation ΔTegr. Next, at step S703, a basic valve opening degree Xbase of the EGR gas switch valve 74 is computed through use of the following equation (8).

$$Xbase = map5\ (NE, Torque) \quad \text{Equation (8)}$$

Next, at step S704, a valve opening degree Xfin of the EGR gas switch valve 74 after the correction is computed through use of the following equation (9).

$$Xfin = Xbase + Xfb \quad \text{Equation (9)}$$

The EGR gas switch valve 74 is operated to achieve the corrected EGR gas switch valve opening degree Xfin.

In the above embodiment, there is described the exemplary case where the representative value of the EGR gas temperature is the EGR valve 75 passing gas temperature. Alternatively, the intake air temperature may be used as the representative value of the EGR gas temperature. In such a case, the output value of the intake air temperature sensor may be directly used as the representative value, and the flowcharts of FIGS. 7–9 may be eliminated to simplify the computations.

As discussed above, in the regeneration time of the DPF 5, the exhaust gas temperature provided to the DPF 5 can be set to the suitable temperature, which is suitable for increasing the temperature. Thus, the temperature increasing effect of the DPF 5 and the NOx reducing effect are balanced to achieve the effective DPF regeneration and EGR control, thereby implementing the high performance exhaust gas purifying apparatus.

Additional advantages and modifications will readily occur to those skilled in the art. The invention in its broader terms is therefore not limited to the specific details, representative apparatus, and illustrative examples shown and described.

What is claimed is:

1. An exhaust gas purifying apparatus for an internal combustion engine, the exhaust gas purifying apparatus comprising:

a particulate filter that is arranged in an exhaust gas passage of the internal combustion engine to collect particulates contained in exhaust gas in the exhaust gas passage;

a regeneration control means for regenerating the particulate filter by increasing a temperature of the particulate filter to combust and remove the particulates accumulated on the particulate filter;

an EGR passage that recirculates a portion of the exhaust gas as EGR gas from the exhaust gas passage into an intake air passage of the internal combustion engine, which conducts intake air; and an EGR control means for controlling a temperature and a flow rate of the EGR gas, which is recirculated into the intake air passage through the EGR passage, based on a demand of the internal combustion engine, wherein the EGR control means includes a regeneration time EGR control means for executing an EGR operation for controlling the temperature and the flow rate of the EGR gas in regeneration time of the particulate filter, during which the particulate filter is regenerated by the regeneration control means, and the regeneration time EGR control means controls a degree of the EGR operation such that a temperature of the exhaust gas, which is supplied to the particulate filter, becomes a suitable temperature, which is suitable for regeneration of the particulate filter.

2. The exhaust gas purifying apparatus according to claim 1, wherein:

the EGR passage includes:

a main passage that has an EGR cooler, which cools the EGR gas; and a bypass passage that bypasses the EGR cooler and communicates between the exhaust gas passage and the intake air passage; and the regeneration time EGR control means controls the temperature of the EGR gas, which is recirculated into the intake air passage in the regeneration time of the particulate filter, to a target temperature by adjusting one of:

a quantity of the EGR gas, which passes the main passage, and a quantity of the EGR gas, which passes the bypass passage; and a ratio between the EGR gas, which passes the main passage, and the EGR gas, which passes the bypass passage.

3. The exhaust gas purifying apparatus according to claim 2, wherein based on at least one of a temperature of the intake air and a load state of the internal combustion engine, the regeneration time EGR control means controls the one of:
 the quantity of the EGR gas, which passes the main passage, and the quantity of the EGR gas, which passes the bypass passage; and
 the ratio between the EGR gas, which passes the main passage, and the EGR gas, which passes the bypass passage.

4. The exhaust gas purifying apparatus according to claim 2, further comprising:
 a valve member that linearly, variably controls one of:
  a mixing quantity of the EGR gas, which passes the main passage, and a mixing quantity of the EGR gas, which passes the bypass passage; and
  a mixing ratio between the EGR gas, which passes the main passage, and the EGR gas, which passes the bypass passage; and
 an EGR valve that controls a flow rate of the EGR gas, which passes through the valve member and is merged into the intake air passage.

5. The exhaust gas purifying apparatus according to claim 4, wherein the regeneration time EGR control means controls the valve member based at least on a temperature of the intake air, which is measured upon merging of the EGR gas into the intake air in the intake air passage, so that the temperature of the EGR gas, which is recirculated into the intake air passage in the regeneration time of the particulate filter, is adjusted to the target temperature.

6. The exhaust gas purifying apparatus according to claim 4, wherein:
 the regeneration time EGR control means includes an estimating means for estimating an EGR valve passing gas temperature, which is a temperature of the EGR gas that passes the EGR valve; and
 the regeneration time EGR control means operates the valve member based on the estimated EGR valve passing gas temperature, so that the temperature of the EGR gas, which is recirculated into the intake air passage in the regeneration time of the particulate filter, is adjusted to the target temperature.

7. The exhaust gas purifying apparatus according to claim 1, wherein the regeneration time EGR control means sets the target temperature of the EGR gas, which is recirculated into the intake passage in the regeneration time of the particulate filter, based on a tolerable temperature of a member, which is arranged in the EGR passage.

8. The exhaust gas purifying apparatus according to claim 2, wherein:
 the EGR control means further includes a non-regeneration time EGR control means for executing an EGR operation for controlling the temperature and the flow rate of the EGR gas in non-regeneration time of the particulate filter, during which the particulate filter is not regenerated by the regeneration control means; and
 based on at least one of the temperature of the intake air and the load state of the internal combustion engine, the non-regeneration time EGR control means controls one of:
  the quantity of the EGR gas, which passes the main passage, and the quantity of the EGR gas, which passes the bypass passage; and
  the ratio between the EGR gas, which passes the main passage, and the EGR gas, which passes the bypass passage.

9. The exhaust gas purifying apparatus according to claim 8, wherein the non-regeneration time EGR control means controls a degree of the EGR operation based on a degree of progress of warming up of the internal combustion engine.

10. The exhaust gas purifying apparatus according to claim 1, wherein the EGR control means further includes an EGR stop means for stopping the EGR operation upon satisfaction of at least one of the following conditions:
 the temperature of the exhaust gas, which is outputted from the internal combustion engine, is predicted to exceed a predetermined temperature; and
 a combustion state of the internal combustion engine is predicted to be unstable.

11. The exhaust gas purifying apparatus according to claim 10, wherein the EGR stop means determines whether the EGR operation needs to be stopped based on at last one of the temperature of the intake air and a load state of the internal combustion engine.

12. The exhaust gas purifying apparatus according to claim 10, wherein the EGR stop means determines whether the EGR operation needs to be stopped based on at least one of fuel injection timing, a post fuel injection quantity and a fuel injection pattern of the internal combustion engine.

13. The exhaust gas purifying apparatus according to claim 12, wherein the EGR stop means stops the EGR operation when three or more fuel injections are performed per fuel injection cycle in each cylinder of the internal combustion engine.

14. The exhaust gas purifying apparatus according to claim 1, wherein the regeneration time EGR control means controls the degree of the EGR operation in such a manner that the temperature of the exhaust gas on an upstream side of the particulate filter is increased.

* * * * *